Patented Feb. 20, 1934

1,947,870

UNITED STATES PATENT OFFICE 1,947,870

METHOD OF FORMING ORNAMENTAL SURFACES FROM DISPERSED MEDIA

Edward Arthur Murphy, Erdington, Birmingham, and Eric William Bower Owen, Walmley, England, assignors to Dunlop Rubber Company Limited, a British corporation No Drawing. Application March 31, 1931, Serial No. 526,782, and in Great Britain July 10, 1930

6 Claims. (Cl. 91—68)

This invention relates to a method for imparting irregular patterns or ornamentations suggestive of the wave-markings for example on certain leathers such as crocodile or alligator leather to rigid or non-rigid surfaces of articles or materials such as of hard or soft rubber, glass, wood, leather, metal or artificial resins.

The object of the invention is to impart irregular patterns of the aforesaid type to the rigid or non-rigid surfaces of the articles or materials by the application thereto, of emulsions or dispersions preferably aqueous emulsions or dispersions of organic materials of the kinds hereinafter specified, conditioned to coagulate preferably comparatively slowly and to produce coagula of initially low mechanical strength. For the purpose of this invention emulsions of solutions in organic solvents of the aforesaid organic materials can also be employed. Organic emulsions of aqueous solutions of the aforesaid organic materials can also be used.

According to the invention coagula of initially low mechanical strength are produced by adjusting any one or more of factors such as alkalinity or concentration of the aqueous dispersions or strength of the coagulating medium to be employed, so that when a film of the dispersions aforesaid supported on a suitable backing is contacted with the coagulating medium, preferably of higher specific gravity, the rate of coagulation is comparatively slow and the initially resulting coagulum low in mechanical strength, thereby producing an irregular pattern suggestive of the markings on certain leathers such as crocodile or alligator leather.

The coagulum is not produced as a continuous uniform film but tends to gather into irregular ridges.

The film with the foresaid markings may be left in position on its backing or may be removed for or by subsequent application to other surfaces.

It is suggested that the aforesaid effect is probably due to the inability of the partially coagulated weak film to withstand the mechanical stresses to which it is subjected while in contact with the coagulating medium.

The emulsions or dispersions of organic substances may, for example, be natural or artificial dispersions of rubber or other natural resins in non-vulcanized or vulcanized condition, gelatine, casein, viscose, synthetic resins, cellulose esters or others in a non-compounded or compounded condition. These organic substances may also, if desired, be employed in solution in solvents which solutions are thereafter converted into emulsions or dispersions. Any one or more of these organic substances may also be employed as alternatives or admixtures.

The coagulation of the deposits obtained from the emulsions or dispersions aforesaid can be effected merely by drying with or without heating by contacting the deposits with a coagulating solution or with a dehydrating and setting fluid such as a solution of calcium chloride or of fused low melting salt such as sodium acetate as described and claimed in Patent 1,887,190.

The uncoagulated layers of the dispersions aforesaid can also be brought into contact with single or mixed liquids which effect coagulation and swelling concurrently by subjecting them to baths such as a solution of acetic acid and a rubber solvent such as benzene as described and claimed in Patent 1,886,351.

It has been found that working with aqueous dispersions of rubber it is preferable to use latex mixings of comparatively low concentration, for instance, 25% to 30% total solids and of considerable alkalinity, for instance, 0.5% ammonia.

The markings can be produced in a continuous manner on rubber sheeting by, for example, spreading the surface of the sheeting with a specially prepared dispersion and then allowing it to pass immediately into a coagulating medium.

It is very desirable that the surface to be treated should be free from surface moisture and capable of being wetted uniformly by the latex deposit used in producing the effect. It should also have no tendency to coagulate this deposit.

If the surface to be treated is that of a freshly coagulated latex film it is first preferably immersed in an alkaline solution such as a 5% ammonia or 2% caustic soda solution for a few minutes to prevent any activity on the part of any remaining traces of any coagulant. Superfluous moisture is then removed and the surface is dipped into a dilute latex mixing of the desired colour.

An example of a suitable latex mixing is as follows:

| Composition | Parts by weight |
|---|---|
| Rubber | 87 |
| Sulphur | 1.5 |
| Zinc oxide | 4.0 |
| Tetramethyl thiuramdisulphide | 0.5 |
| Pigment | 2.0 |
| Mineral oil | 5.0 |

The total solid content of the mixing is preferably 30% and the alkalinity 0.5%.

After withdrawal the coated surface is immediately dipped into a 5% acetic acid solution. The marking is formed during the immersion.

What we claim is:

1. The method of forming irregular ornamental surfaces suggestive of wave-like contours which comprises contacting the surface of an aqueous dispersion of organic materials with a coagulant, the alkalinity and concentration of the dispersion being adjusted to the strength of the coagulant to produce a coagulum of such low mechanical strength as to permit the superficial gathering of the coagulated surface to simulate wave-like contours, in which the dispersion is a dispersion of rubber material containing from about 25% to 30% total solids and an alkalinity equal to 0.5 of ammonia and in which the coagulant is a 5% solution of acetic acid.

2. The method of forming irregular ornamental surfaces suggestive of wave-like contours which comprises contacting the surface of an aqueous dispersion of organic materials with a coagulant, the alkalinity and concentration of the dispersion being adjusted to the strength of the coagulant to produce a coagulum of such low mechanical strength as to permit the superficial gathering of the coagulated surface to simulate wave-like contours, in which the dispersion is a dispersion of rubber material containing from about 25% to 30% total solids and an alkalinity equal to 0.5 of ammonia in which the coagulant is a 5% solution of acetic acid, and in which the final coagulating and setting of the dispersion is obtained by contact with a dehydrating and setting fluid.

3. The method of forming irregular ornamental surfaces suggestive of wave-like contours which comprises contacting the surface of an aqueous dispersion of organic materials with a coagulant, the alkalinity and concentration of the dispersion being adjusted to the strength of the coagulant to produce a coagulum of such low mechanical strength as to permit the superficial gathering of the coagulated surface to simulate wave-like contours, in which the dispersion is a dispersion of rubber material containing from about 25% to 30% total solids and an alkalinity equal to 0.5 of ammonia in which the coagulant is a 5% solution of acetic acid, and in which the final coagulating and setting of the dispersion is obtained by contact with a fused low melting salt.

4. A method of forming irregular ornamental surfaces suggestive of wave-like contours which comprises contacting the surface of an aqueous dispersion of organic materials with a coagulant, the alkalinity and concentration of the dispersion being adjusted to the strength of the coagulant to produce a coagulum of such low mechanical strength as to permit the superficial gathering of the coagulated surface to simulate wave-like contours, and in which the initial coagulation is produced by a coagulant of higher specific gravity than that of said dispersion.

5. A method of forming irregular ornamental surfaces suggestive of wave-like contours which comprises depositing on a coagulant-free surface of a former or backing stratum an aqueous dispersion of organic materials of comparatively low concentration and relatively high alkalinity, and thereafter slowly coagulating this deposit preferably by slowly introducing the deposit into a coagulant.

6. A method of forming irregular ornamental surfaces suggestive of wave-like contours which comprises depositing on a coagulant-free surface of a former or backing stratum an alkaline aqueous dispersion of organic materials of low concentration, and immersing said surface and its deposit of aqueous dispersion into a weak coagulant at such a rate that the surface tension draws said deposit into wave-like markings as it is immersed.

EDWARD ARTHUR MURPHY.
ERIC WILLIAM BOWER OWEN.